E. J. GERDOM & C. W. SCHINDLER, dec'd,

A. COOK & P. PULVER, assignees by mesne assignments.

OIL CUP FOR LUBRICATING SHAFTS.

No. 9,784. Reissued July 5, 1881.

Witnesses.

Chas. Wahlers.

William Miller

Assignees of Inventors.

Adam Cook &

Peter Pulver by Van Santvoord & Hauff

Attys.

N. PETERS, Photo-Lithographer, Washington, D. C.

UNITED STATES PATENT OFFICE.

ADAM COOK AND PETER PULVER, OF NEW YORK, N. Y., ASSIGNEES, BY MESNE ASSIGNMENTS, OF EMERICH J. GERDOM AND CHARLES W. SCHINDLER, DECEASED.

OIL-CUP FOR LUBRICATING SHAFTS.

SPECIFICATION forming part of Reissued Letters Patent No. 9,784, dated July 5, 1881.

Original No. 73,795, dated January 28, 1868. Application for reissue filed June 1, 1881.

*To all whom it may concern:*

Be it known that EMERICH JOSEPH GERDOM and CHARLES WILLIAM SCHINDLER, both of Albany, New York, did invent certain new and useful Improvements in Oil-Cups for Lubricating Shafts, of which the following is a specification.

This invention relates to lubricators for the journals of machinery in which the lubricant is fed automatically from a cup or holder.

Figure 1:
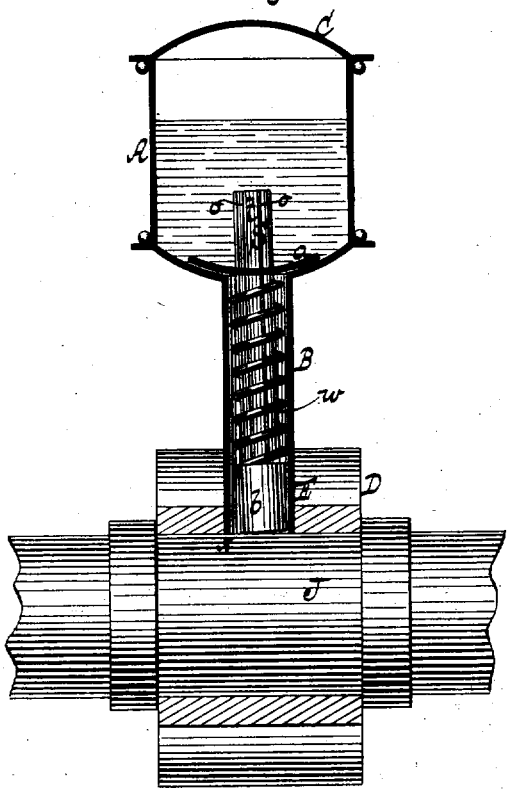
Figure 2:
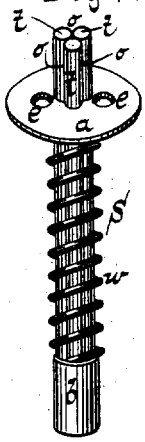

This invention is illustrated in the accompanying drawings, in which Figure 1 represents the lubricator in position as attached to the journal-box of a shaft, the cup with its stem and the box being in vertical central section, the oil-feeder and the journal in full body. Fig. 2 shows the feeder in perspective.

Similar letters indicate corresponding parts.

The letter A designates the body of the cup, B its tubular stem extending downward from the bottom thereof, and C the top of the cup.

D is the journal-box, having the usual opening, E, in its cap-plate, into which the stem B is inserted at its lower end.

Within the stem B is placed a metallic shaft or oil-feeder, S, which rests on the journal J at its lower end, so as to become heated by the motion of the journal, and which projects above the bottom of the cup at its upper end, thus transmitting the heat from the journal to the lubricant contained in the cup. This feeder S is surrounded by a spiral wire, *w*, and in the body thereof are formed longitudinal corrugations *o*, these corrugations being produced by constructing the device of a series of tubes, *t*, which are held together by a disk or plate, *a*, at or near the top, and by a band, *b*, at or near the bottom, assisted by the spiral wire *w*. In the disk *a* are formed holes *e*, which allow the lubricant to pass from the interior of the cup A to the feeder S.

Our lubricator is intended to be used with stiff preparations or unguents of tallow or fat, or any oil, animal or vegetable, it being a well-known fact that such compositions are far more economical than oils usually employed for lubricating purposes. The lubricant having been placed in the cup A, that portion thereof near the upper end or portion of the feeder S is rendered fluid by the heat before mentioned, and is conducted to the journal by the spiral wire *w*, the corrugations *o*, and the interior of the tubes *t*, either of these parts forming an independent conductor, whereby a uniform flow or supply of the material to the journal is produced. The effect of the feeder S is increased by imparting thereto a revolving motion, and to this end it is so arranged that it approaches the journal J, not at a right angle to it, but with a slight inclination—namely, so that the edge of the band *b* touches the journal at one point or corner only, as at *x*—the result of this arrangement being that the surface of the journal and the edge of the band act as bevel-gear, driving the feeder with the velocity due to the difference in their respective diameters.

The applicants for this patent prepare an unguent the employment of which results in a large saving of cost as compared with the lubricants formerly used, and the nature of whose composition is such that the mass will not be rendered more fluid than to allow the passing of a regulated quantity (enough without waste) to the journal.

What is claimed as new, and desired to be secured by Letters Patent, is—

1. The combination, substantially as hereinbefore set forth, with the oil-cup, of the shaft or feeder having the spiral wire surrounding its body, for the purpose described.

2. The combination, substantially as hereinbefore set forth, with the oil-cup, of the shaft or feeder provided with longitudinal corrugations, and the spiral wire surrounding its body, for the purpose described.

3. The combination, substantially as hereinbefore set forth, with the oil-cup, of the shaft or feeder constructed of tubes, and the spiral wire surrounding the tubes, for the purpose described.

4. The combination, with the oil-cup, of a shaft or feeder having its lower end constructed to bear upon the journal at a single point only, as at *x*, substantially as and for the purpose described.

5. The combination, with the oil-cup, of the shaft or feeder constructed of a series of tubes having their lower ends provided with a band constructed to bear upon the journal at a single point only, as at *x*, substantially as and for the purpose described.

ADAM COOK.
PETER PULVER.

Witnesses:
W. HAUFF,
CHAS. WAHLERS.